July 13, 1943. D. F. McGILL 2,323,926
HYDRAULIC TRANSMISSION
Filed June 7, 1937 8 Sheets-Sheet 1
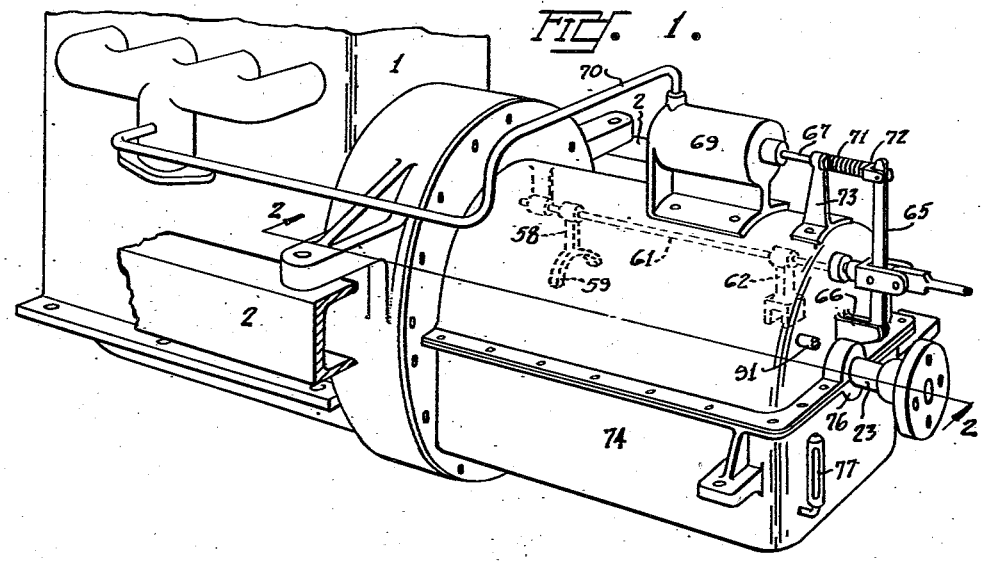
INVENTOR
DANIEL F. McGILL
BY Harold L. Cook
ATTORNEY.

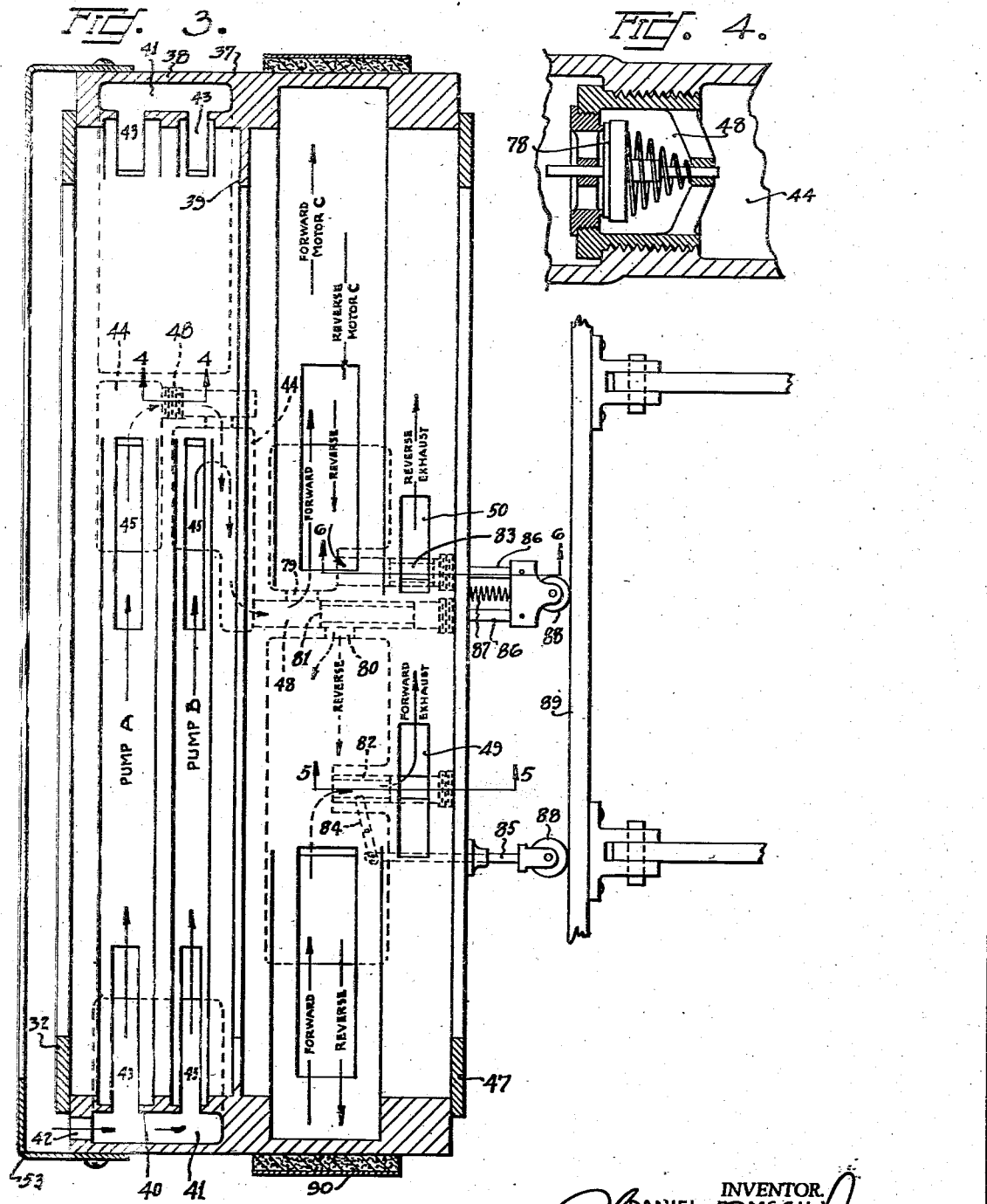

July 13, 1943.　　　　D. F. McGILL　　　　2,323,926
HYDRAULIC TRANSMISSION
Filed June 7, 1937　　　8 Sheets-Sheet 3
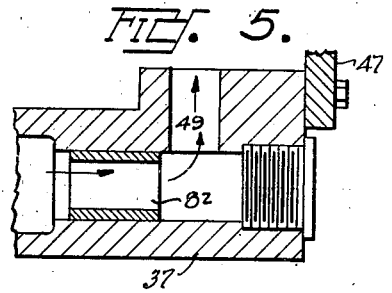
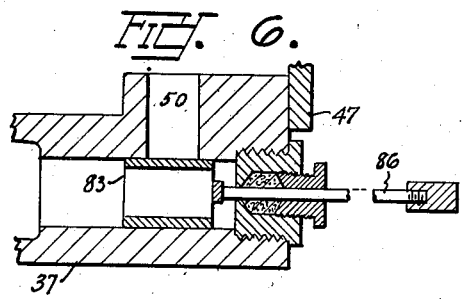
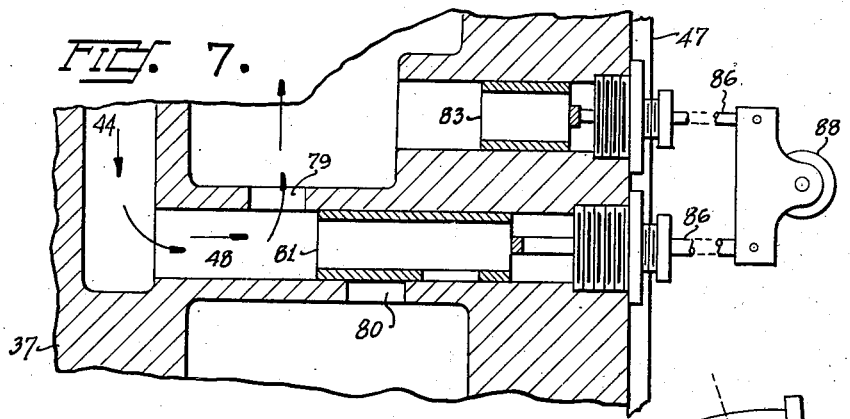
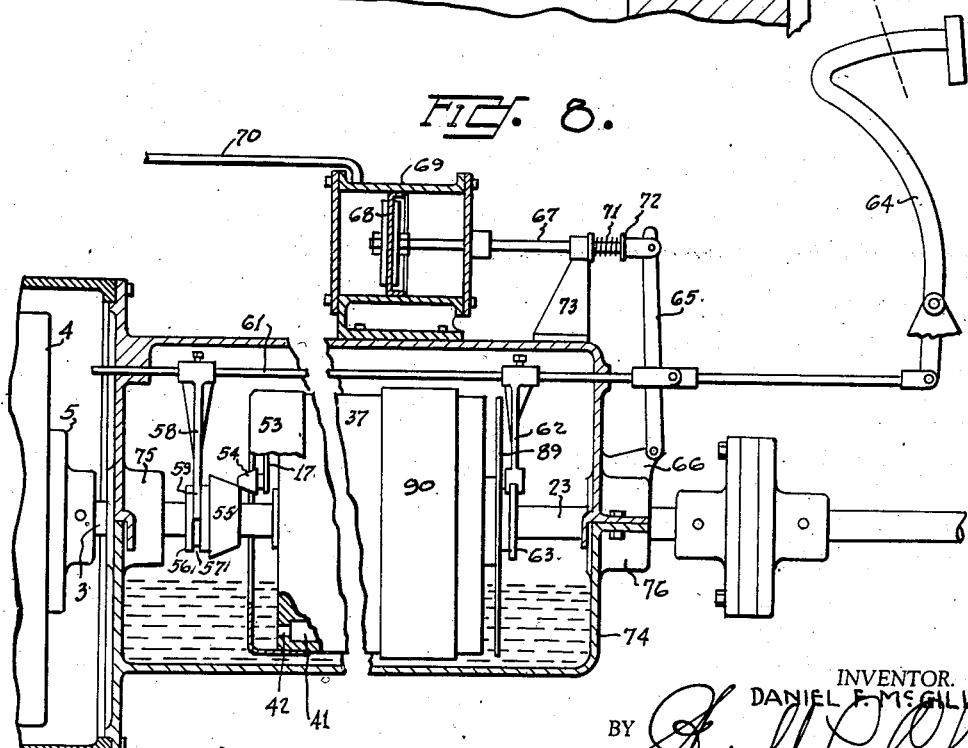
INVENTOR.
DANIEL F. McGILL
BY Harold L. Cook
ATTORNEY.

July 13, 1943.    D. F. McGILL    2,323,926
HYDRAULIC TRANSMISSION
Filed June 7, 1937    8 Sheets-Sheet 4
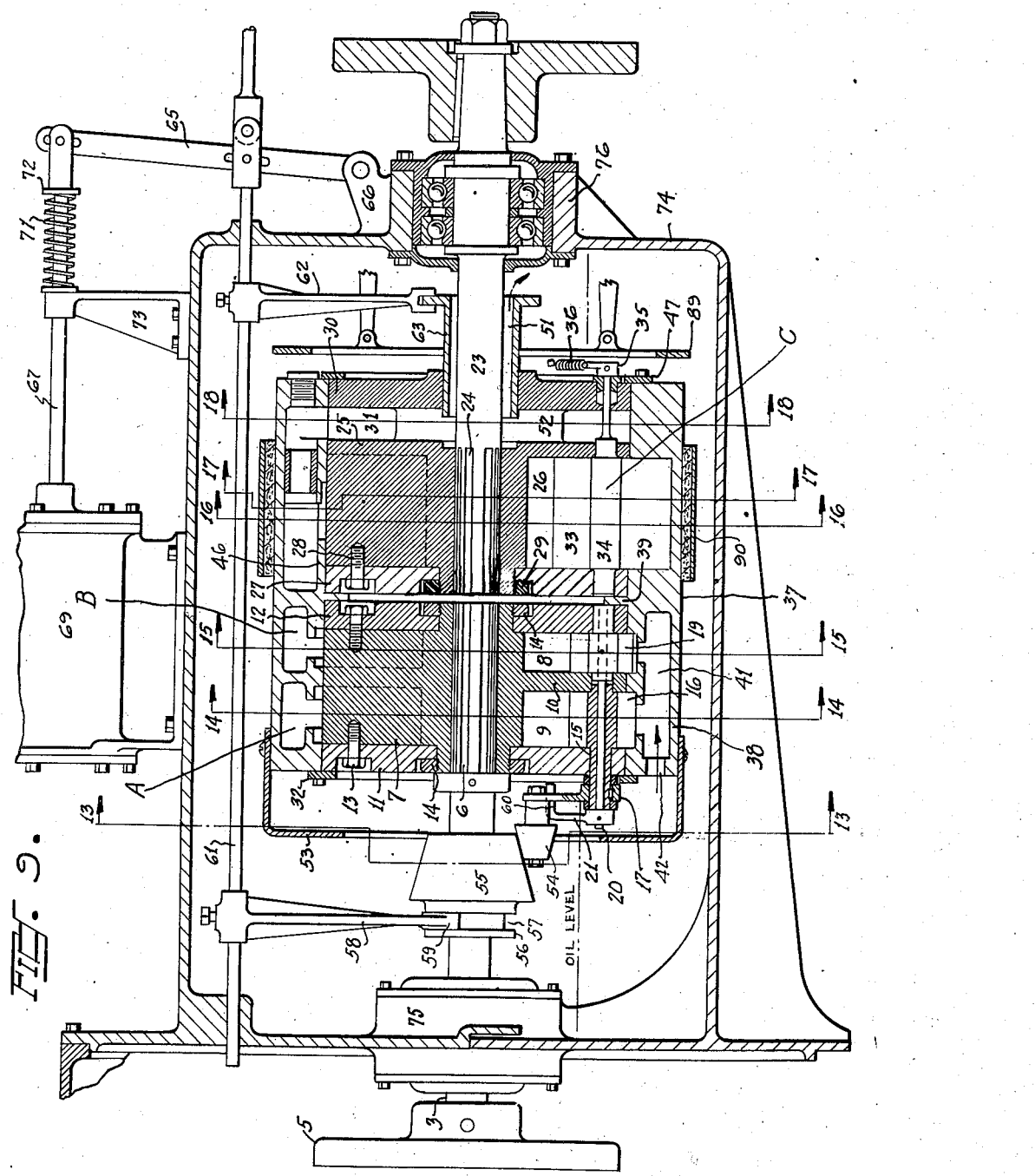

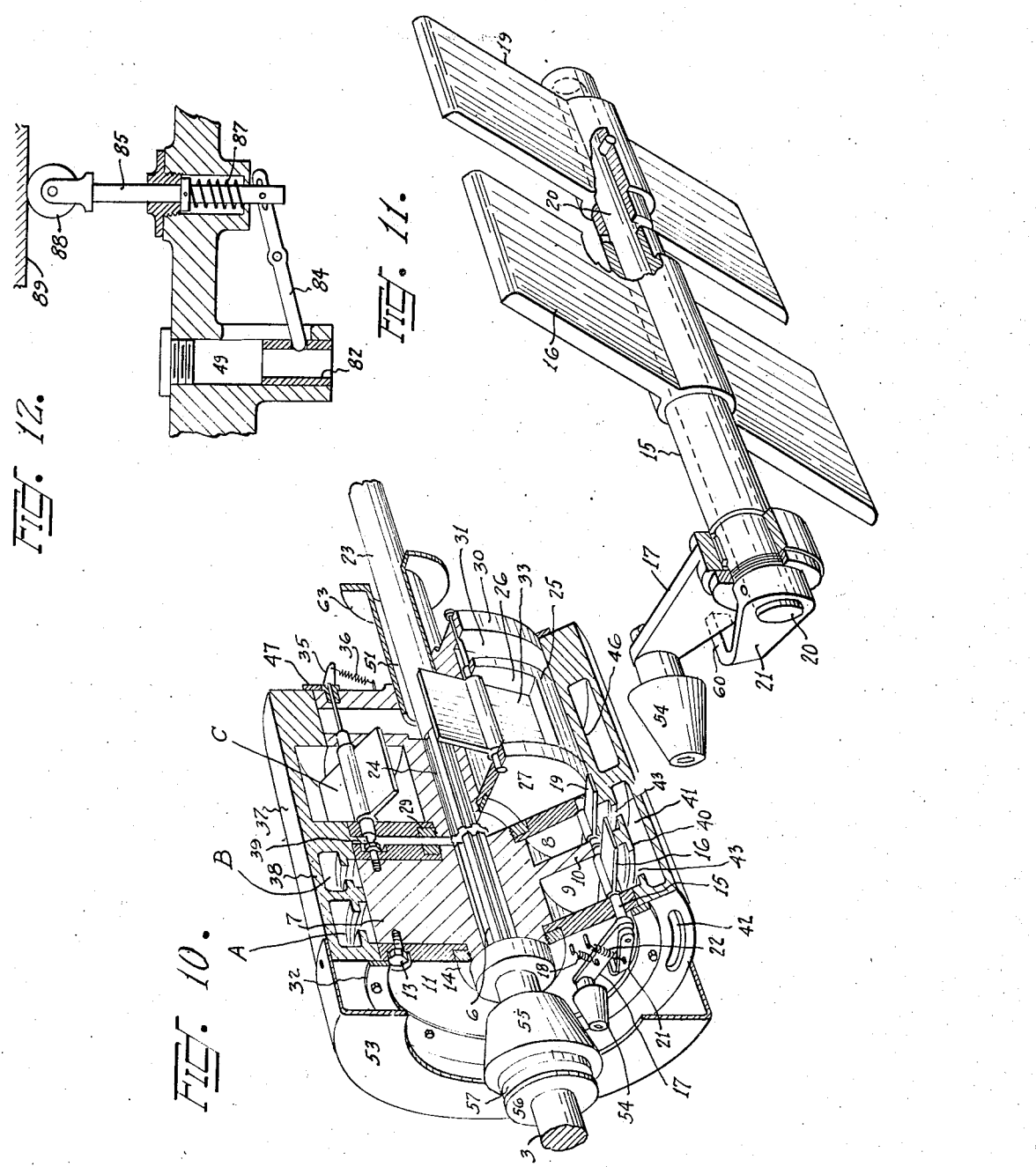

July 13, 1943. D. F. McGILL 2,323,926
HYDRAULIC TRANSMISSION
Filed June 7, 1937 8 Sheets-Sheet 6

INVENTOR.
DANIEL F. McGILL
BY Harold L. Cook
ATTORNEY.

July 13, 1943.  D. F. McGILL  2,323,926
HYDRAULIC TRANSMISSION
Filed June 7, 1937  8 Sheets-Sheet 8

INVENTOR
DANIEL F. McGILL
BY Harold L. Cook
ATTORNEY.

Patented July 13, 1943

2,323,926

UNITED STATES PATENT OFFICE 2,323,926

HYDRAULIC TRANSMISSION

Daniel F. McGill, Multnomah, Oreg., assignor to Donald W. Green, Portland, Oreg., as trustee Application June 7, 1937, Serial No. 146,901

16 Claims. (Cl. 60—53)

This invention relates to a hydraulic transmission unit for transmitting power from a power unit to a driven unit through the medium of fluid under pressure, and has particular reference to a novel construction and arrangement of pump elements and control means therefor to provide a universal gear ratio between driving and driven units.

By way of simple illustration, the principle of the invention may best be understood by disclosing it as employed to transmit power from the drive shaft of an internal combustion engine to a driven shaft, as in an automobile. Power is transmitted by means of a fluid which is put in motion by one or more pumps directly connected to the drive shaft and delivered to one or more receiving pumps or motors directly connected to the driven shaft. All of the pumps, both delivery and receiving, operate in a cylindrical casing which is rotatable independently of the pump rotors and independently of both the drive shaft and the driven shaft. Rotation of the cylindrical casing is controlled either by torque or by braking means or by both torque and braking means.

A positive gear ratio is obtained by the fluid pressures created by operation of the delivery pumps and the delivery of fluid therefrom to the receiving pump or motor. The operation of the delivery pumps may be controlled either manually or automatically, independently of the operation of the power unit; and the operation of the receiving pump or motor may be controlled either manually or by an exhaust valve operated by the delivery pump control means.

No valves, other than the exhaust valve are necessary for operation of the mechanism while the vehicle is being driven forward. When the exhaust valve is closed the mechanism is fluid locked and is caused to rotate as one unit, constituting a direct mechanical coupling. To cause the vehicle to be driven rearwardly, valves are employed to divert the flow of fluid to the reverse sides of the blades of the driven motor to cause the driven shaft to be rotated in a reverse direction. When the receiving pump or motor is driven in reverse, the cylindrical casing is held stationary by braking means to effect a mechanism for simple hydraulic transmission of power.

Primarily, it is an object of the invention to provide a mechanism for transmitting power from a prime mover to a driven unit through the medium of fluid under pressure.

A further object of the invention is to provide a mechanism for transmitting power from a prime mover to a driven unit through the medium of a fluid under pressure whereby to create a positive drive for the driven unit at universal speed ratios.

A further object of the invention is to provide a mechanism for transmitting power from a prime mover to a driven unit through the medium of fluid under pressure, and having automatic transmission ratio controlling means actuated by the load upon the prime mover.

A further object of the invention is to provide a mechanism for transmitting power from a prime mover to a driven unit through the medium of fluid under pressure wherein the operation of the fluid pressure producing means may be controlled automatically or manually, and independently of the operation of the prime mover, to effect either idling, gearing or direct coupling between the prime mover and the driven unit.

A further object of the invention is to provide a mechanism for transmitting power from a prime mover to a driven unit through the medium of fluid under pressure to operate the same in either a forward or a reverse direction, and in such manner as to create a positive drive for the driven unit in either direction at universal speed ratios.

The invention thus provides a mechanism which is operable to effect the desired results at relatively low pressures and with losses due to friction and heat reduced to a minimum. When the vehicle is driven forward, whatever friction is created within the floating cylindrical casing which encloses the pump elements tends toward driving the driven shaft, and does not constitute a loss of power. In addition, an important advantage of the invention lies in the flexibility of the mechanism and the attendant lessening of sudden strain or shock upon the driving and driven units.

With these and other objects and advantages in view, the invention resides in the novel construction and combination of parts hereinafter described, illustrated in the accompanying drawings and set forth in the appended claims; it being understood that various changes in form, proportion, size and details of construction within the scope of the claims may be resorted to without departing from the spirit or sacrificing any of the advantages of the invention.

In the drawings:

Figure 1 is a perspective view of a device embodying the principles of applicant's invention as applied to transmit power from an internal combustion engine to a driven shaft.

Figure 2 is a longitudinal elevation, partly in section, taken along the line 2—2 of Figure 1. This view illustrates the position of the control mechanism when the transmission is in neutral position.

Figure 3 is a view in a flat plane of the interior surface of the cylindrical casing, showing the various inlet and discharge ports for the respective pump chambers. The course of fluid through the device for forward drive is indicated by arrows and broken lines. The course of fluid through the device for reverse drive is indicated by arrows and dotted lines.

Figure 4 is an enlarged section through the check valve between delivery pumps, taken on the line 4—4 of Figure 3.

Figure 5 is an enlarged section through the forward exhaust port showing the course of liquid therethrough, taken on the line 5—5 of Figure 3.

Figure 6 is an enlarged section through the reverse exhaust port showing the valve therefor in closed position, taken on the line 6—6 of Figure 3.

Figure 7 is an enlarged section through the intake passage for the receiving pump or motor, illustrating the relative positions of the intake ports for forward and reverse drive.

Figures 5, 6 and 7 illustrate the valve settings for the respective ports when the rotation of the receiving pump or motor is in the same direction as the rotation of the drive shaft.

Figure 8 is a longitudinal elevation, partly in section, similar to Figure 2, showing the relative positions of the control mechanism when the vehicle is in operation.

Figure 9 is a longitudinal sectional elevation of the transmission assembly.

Figure 10 is a perspective view of the transmission assembly, certain portions being cut away to better illustrate the construction and relative positions of the delivery and receiving pumps.

Figure 11 is a perspective view of the rotor blades for the delivery pumps and the control arms therefor.

Figure 12 is an enlarged section through the forward exhaust port illustrating the spindle and lever for operating the valve.

Figure 13:
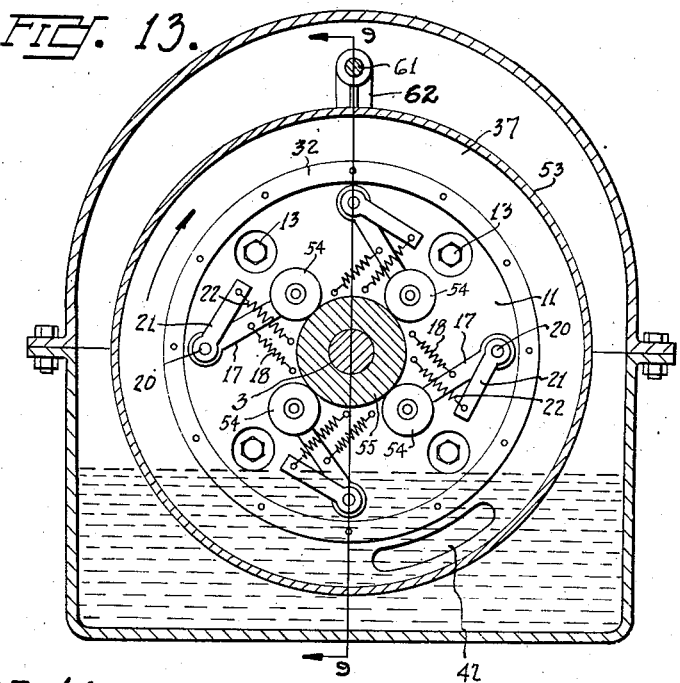

Figure 13 is a transverse sectional elevation taken on the line 13—13 of Figure 9.

Figure 14:
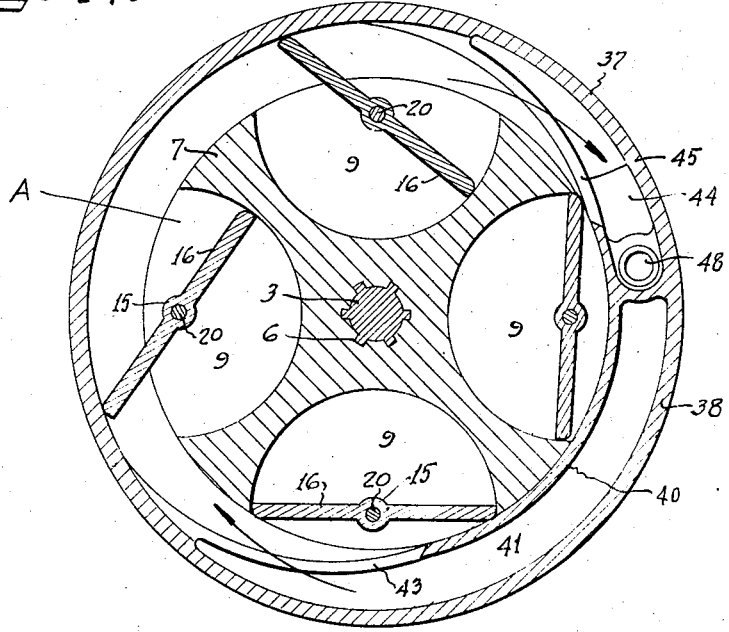

Figure 14 is a transverse sectional elevation taken on the line 14—14 of Figure 9, being a section through the delivery pump A with the rotor blades in operative position.

Figure 15:
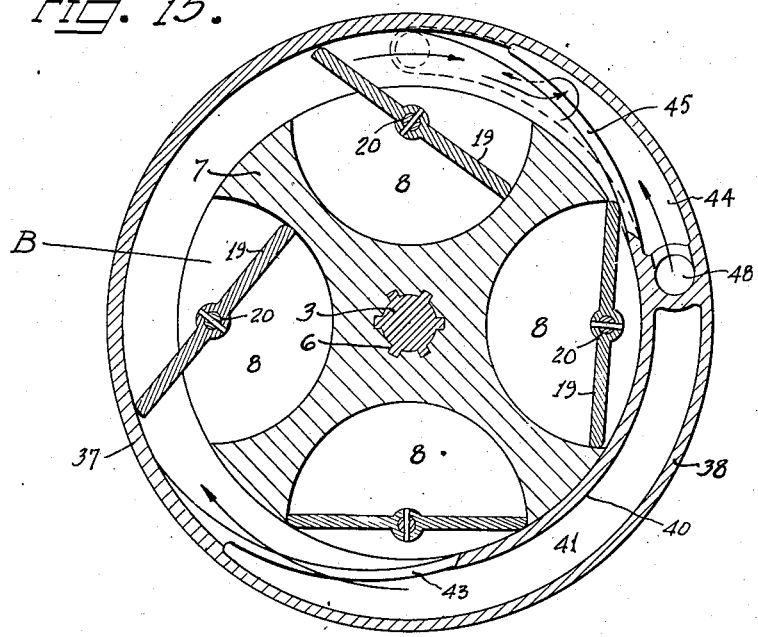

Figure 15 is a transverse sectional elevation taken on the line 15—15 of Figure 9, being a section through the delivery pump B with the rotor blades in operative position.

Figure 16:
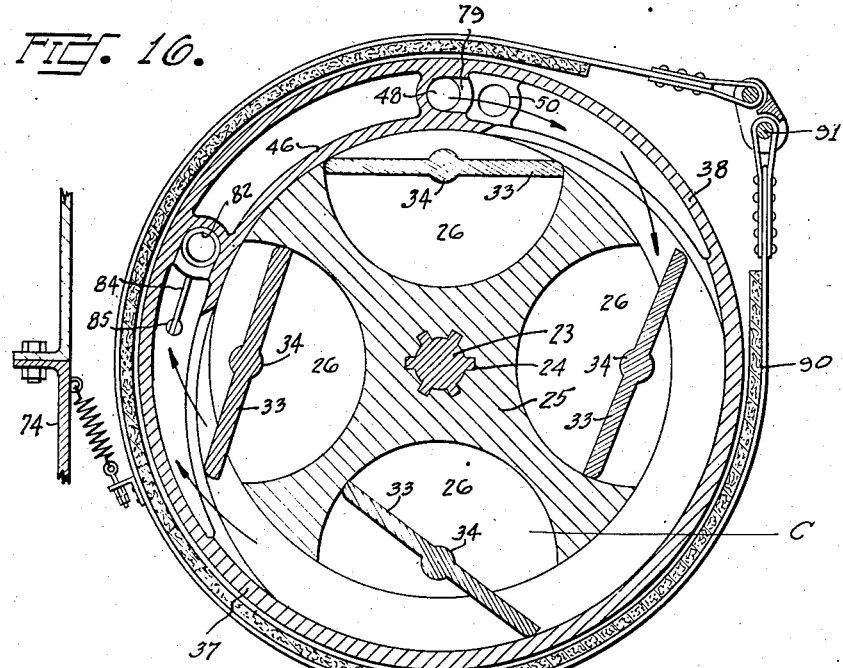

Figure 16 is a transverse sectional elevation taken on the line 16—16 of Figure 9, being a section through the receiving pump or motor and indicating the course of fluid therethrough to rotate the driven shaft in the direction of rotation of the drive shaft.

Figure 17:
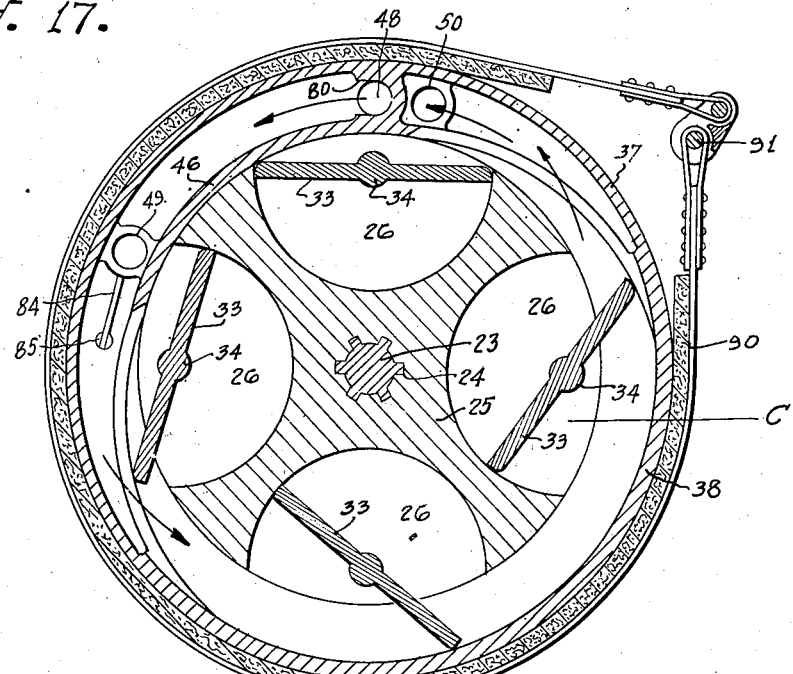

Figure 17 is a transverse sectional elevation taken on the line 17—17 of Figure 9, being a section through the receiving pump or motor and indicating the course of fluid therethrough to rotate the driven shaft in a direction opposed to the direction of rotation of the drive shaft.

Figure 18:
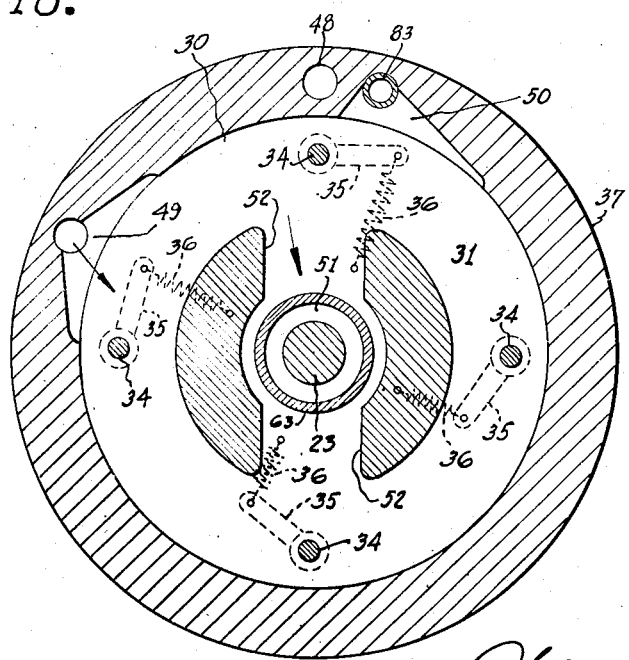

Figure 18 is a transverse sectional elevation taken on the line 18—18 of Figure 9.

In the drawings the prime mover is illustrated as an internal combustion engine 1, a portion of the supporting framework of a motor vehicle being shown at 2. The numeral 3 designates a shaft secured to the flywheel 4 of the motor by coupling means 5 in such manner as to be rotated therewith.

The present embodiment of applicant's device is illustrated, for purposes of simplicity, as having rotary pumps in both the delivery and the receiving ends of the casing, but the broader aspects of the invention could be carried out as well with other types of pumps.

*Front rotor assembly*

Secured to the shaft 3 as by splines 6 is a rotor 7, the opposite ends of which are milled out to form rotor chambers 8 and 9. Rotor chambers 8 are those in the rear end of the rotor 7, and rotor chambers 9 are those in the front end of the rotor 7. The rotor chambers are spaced apart 90° circumferentially of the rotor. The rotor chambers 8 and 9 are axially aligned in the rotor, being separated by a central or intermediate partition 10. Affixed to the respective ends of the rotor 7 are bearing plates—front bearing plate 11, and rear bearing plate 12—which serve also as end walls or shroud plates for the rotor chambers 8 and 9 respectively. These bearing or shroud plates are secured to the respective ends of the rotor 7 by means of cap screws 13, and by means of nuts 14—14 which are screwed onto axial extensions of the hub of the rotor.

Diametrically centered in the rotor chambers 9 are tubular shafts 15, journaled in the partition 10 and in the bearing plate 11, to which are keyed rotor blades 16. Each of the shafts 15 extends through the front bearing plate 11, and to the extended end of each shaft 15 is fastened a control arm 17. Each control arm 17 is engaged by a spring 18 which tends to urge the free end of the control arm inwardly toward the shaft 3. When the control arms 17 are in this position, the shaft 15 is rotated to bring the rotor blades 16 into contact with the working surface of the pump casing. Thus the rotor blades 16 are under control of the control arms 17, which serve as levers to move the rotor blades into and out of contact with the working surface of the pump casing in a manner hereinafter more particularly described.

Disposed within each of the rotor chambers 8 is a rotor blade 19 which is keyed to a shaft 20. Each shaft 20 is journaled in the rear bearing plate 12 and in the central partition 10, and extends through the tubular shaft 15 and projects therefrom forwardly of the front bearing plate 11. To the forward projecting end of the shaft 20 is affixed a control arm 21. The free end of each control arm 21 is engaged by a spring 22 which tends to urge the free end of the control arm inwardly toward the shaft 3, which rotates the shaft 20 to move the rotor blades 19 into contact with the working surface of the pump casing. Both rotor blades 16 and 19 are rotatably mounted within the rotor chambers, the blades being balanced for pressure and gravity, and urged into operative engagement with the working surfaces of the pump casing, through the medium of shafts and control arms, by springs 18 and 22.

In the device illustrated in the drawings the rotor chambers 9 are one and one-half times as wide as the rotor chambers 8. Assuming, therefore, that rotor chambers 8 are one inch in width, rotor chambers 9 are one and one-half inches in width.

Rear rotor assembly

In the adaptation of applicant's invention for use in a motor vehicle, the driven shaft 23 is disposed in axial alignment with the drive shaft 3. Affixed to the driven shaft 23, as by splines 24, is a rotor 25, the inner or forward end of which is milled out to form rotor chambers 26. A bearing plate 27 is affixed to the inner or forward end of the rotor 25, being secured thereto by cap screws 28 and by a nut 29 screwed onto an axial extension of the hub of the rotor. In the illustrated embodiment of the invention the rear rotor 25 has but one set of rotor chambers, the outer or rearward end of the rotor presenting a plane surface and forming the end bearing 30 for the rotor. That portion of the rotor 25 forming the bearing 30 is peripherally grooved to provide a channel 31, the purpose of which will be hereinafter more fully explained.

Rotor chambers 26 are spaced apart 90° circumferentially of the rotor 25, and within each rotor chamber is disposed a rotor blade 33. Each rotor blade is keyed to a shaft 34 journaled in the bearing plate 27 and in the bearing 30, and each said shaft extends through said bearing 30 and projects outwardly therefrom. Affixed to the outer end of each shaft 34 is an arm 35, and the free end of each said arm is engaged by a spring 36 in such manner as to rotate the shaft to urge the blades 33 into contact with the working surface of the pump casing. This construction is similar to that described in connection with the rotor blades 16 and 19 of the front rotor assembly; with the exception, however, that the blades 33 are at all times in contact with the pump casing, no provision being made to move the blades out of contact therewith. It will be obvious, however, that similar provision may be made to move the rotor blades 33 into and out of engagement with the working surface of the pump casing as has been made to so move the rotor blades 16 and 19. The width of the rotor chambers 26 in the device illustrated is three times the width of the front rotor chambers 8, and is 1.2 times the combined width of the front rotor chambers 8 and 9.

Rotor housing

Both the front rotor 7 and the rear rotor 25 are housed in a cylindrical casing 37 which is designed to provide working surfaces for the respective rotor blades, and to coact therewith to form delivery pumps A and B and a receiving pump or motor C, and to contain passages through which fluid is supplied to the respective pumps. The cylindrical casing 37 is floatingly mounted upon the rotors and is rotatable independently of the rotation of either the driving rotor 7 or the driven rotor 25. The cylindrical casing comprises an outer wall 38 which is concentric with the rotors 7 and 25. One end wall of the cylindrical casing is formed by the bearing plate 11, the opposite end wall being formed by the bearing 30.

Interiorly of the casing 37 intermediate the ends thereof is an inwardly extending flange 39 which serves as an abutment for the inner ends of the respective rotors 7 and 25. Forwardly of the flange 39 is an annular inner wall 40 forming an irregularly shaped chamber between the front and rear bearings 11 and 12 of the rotor 7. This chamber is divided longitudinally by the partition 10 between rotor chambers 8 and 9, and the spaces intermediate the front bearing plate 11 and the partition 10, and intermediate the partition 10 and the rear bearing plate 12, defines the chambers for the pumps A and B, respectively. As indicated in Figures 14 and 15 of the drawings, the chambers of delivery pumps A and B are disposed in the same angular relation. Intermediate the inner wall 40 and the outer wall 38 of the cylindrical casing is an intake passage 41 communicating with a suction or input port 42 and communicating with the pump chambers A and B through ports 43—43. Also intermediate the walls 38 and 40 of the casing is a passage 44 providing communication between discharge ports 45—45 of the delivery pumps A and B and the intake passage 48 of the receiving pump or motor C.

Rearwardly of the flange 39 is an annular inner wall 46 forming an irregularly shaped chamber between the front and rear bearings 27 and 30 of the rotor 25, which chamber forms the volute of the receiving pump or motor C. The chamber of the receiving pump C is not of the same angular relation as the chambers of the delivery pumps A and B, like points in the chamber C being displaced from those in chambers A and B by an arc of approximately 150°. This is to insure that the inlet port for the motor C is positioned hydraulically ahead of the discharge ports of the pumps A and B. The relative positions of the walls 40 and 46, and of the points of tangency of connecting curves between the larger arc of the respective chambers and the smaller arc of the respective chambers, may best be determined by comparing Figures 15 and 16 of the drawings.

The walls of the respective pump chambers, i. e., the outer wall of the cylindrical casing and the inner annular walls 40 and 46, are formed upon arcs of concentric circles which are connected by irregular cam-like surfaces. That portion of the wall in the respective chambers formed by the larger arc is the working surface, into engagement with which the rotor blades are urged by the springs secured to the free ends of the control arms. The cam-like surfaces define the openings of the intake and discharge ports, during movement over which the blades are, in turn, moved into and out of the rotor chambers. The rotors 7 and 25 are disposed eccentrically to the pump chambers, and are so mounted as to have but slight clearance between them and that portion of the wall formed upon the smaller arc.

As each successive blade moves over the surface of the wall formed by the larger arc it becomes a working blade; and when moving over the surface of the wall formed by the smaller arc is contained within the rotor chamber, the blade being rotated into inoperative position by the convergence of the wall with the periphery of the rotor. When a blade moves across a port opening it is not a working blade, the port opening permitting fluid to flow around the extended end of the blade. Each blade is balanced for both pressure and gravity and, when in working position, pressure is applied to the full length of the blade, the balance being overcome by force of the spring which serves to urge one end of the blade into engagement with the working surface of the chamber wall.

Intermediate the inner wall 46 and the outer wall 38 of the cylindrical casing is the passage 44 communicating with the pump chamber C through a valved intake passage 48. The passage for fluid to be exhausted from the transmission assembly is formed by the channel 31 grooved in the periphery of the bearing 30, and communicating therewith is a forward exhaust port 49 and a reverse exhaust port 50 which provide selective means for exhausting fluid from the motor chamber C. Fluid is discharged from the transmission assembly by way of a discharge port 51 disposed centrally of the rear bearing 30. Communication is had between the peripheral channel 31 and the discharge port 51 by means of passages 52 extending radially from the discharge port to the channel 31.

At opposite ends of the cylindrical casing, and affixed thereto so as to overlap the outer faces of the bearing plate 11 and the bearing 30, are front and rear sealing rings 32 and 47 which are provided for an obvious purpose.

Affixed to the forward end of the cylindrical casing 37 is a splash guard 53 which serves to prevent fluid being thrown by rotation of the driving rotor 7 and rotor blade control mechanism; but more particularly to prevent all of the fluid draining from the pump chambers in event the cylindrical casing should cease rotation with the port 42 in its lowermost position. In other words, the splash guard insures a supply of fluid in the pump chambers whenever operation is resumed after a period of idleness.

Control mechanism

The mechanism for controlling operation of the delivery pumps A and B properly includes the control arms 17 and 21 heretofore mentioned in connection with the description of the front rotor assembly. Affixed to the free end of each control arm 17 is a cone-shaped roller 54 adapted to be engaged by an annular cone-shaped disc 55 which is slidably mounted upon the shaft 3. The disc 55 is formed with a sleeve 56 having an annular groove 57, and the disc is moved longitudinally of the shaft 3, toward and away from the rotor assembly, through the instrumentality of a bifurcated lever 58 having arms 59 which engage the groove 57. As before stated, the normal position of the control arms 17 is that in which their free ends are in close proximity to the shaft 3, and when the control arms are so positioned the shafts 15 are rotated sufficiently to cause the rotor blades 16 to contact the working surface of the pump chamber A. The relative positions of the control arms 17 and rotor blades 16 is best illustrated in Figures 13 and 14. When the cone-shaped disc 55 is moved toward the rotor assembly its point of smallest circumference engages the apex of each of the cone-shaped rollers 54 and causes the free ends of the control arms 17 to be moved outwardly from the shaft 3. When the control arms are so moved the shafts 15 are rotated to cause the rotor blades 16 to disengage the working surface of the pump casing. As the surface of the disc 55 further engages the surfaces of the cones 54 and the control arms 17 are separated a further distance from the shaft 3—and after the rotor blades 16 have been placed in inoperative position—the control arms 17 engage extensions 60 of the control arms 21 (see Figure 11) so that further outward movement of the control arms 17 also causes the free ends of the control arms 21 to be moved outwardly. In other words, the control arms 17 are permitted sufficient movement before engaging the control arms 21, to cause the rotor blades 16 of the pump A to be retracted into inoperative position in the rotor chambers 9 before any leverage is exerted to rotate the shaft 20 to disengage the rotor blades 19 from the working surface of the pump B. When the disc 55 has been moved toward the rotor assembly so as to have completely engaged the cones 54 and moved the control arms 17 the maximum possible distance from the shaft 3, both the rotor blades 16 and 19 will have been caused to disengage the pump casing, and both delivery pumps A and B will then be inoperative even though the rotors be rotated because of continued operation of the vehicle motor.

As the cone-shaped disc 55 is moved away from the rotor assembly, and the free ends of the control arms 17 and 21 are permitted to move inwardly under impetus of the springs 18 and 22, pump B is first brought into operation because of the fact that the blades 19 are first permitted to engage the working surface of the pump casing. Continued forward movement of the disc 55 causes the control arms 17 to resume their normal positions to bring the rotor blades 16 into operative engagement with the working surface of the pump casing in pump chamber A.

The lever 58 is adjustably secured to a rod 61 which is disposed longitudinally parallel with the driving and driven shafts, and which extends from end to end of the transmission assembly. Also secured to the rod 61 is a lever 62 which engages the flanged end of a tubular valve 63 operable to open and close the discharge port 51. In Figure 2 of the drawings the rod 61 has been moved rearwardly of the transmission assembly, thereby placing the cone-shaped disc 55 in its innermost position, in which position the delivery pumps A and B are rendered inoperative, and the valve 63 is in open position. With the parts in the positions illustrated the shaft 3 may be rotated by continued operation of the vehicle engine without imparting motion to the fluid in the pump chambers. In Figure 8 of the drawings the rod 61 has been moved forwardly of the transmission assembly, thereby closing the discharge port 51 and causing the disc 55 to disengage the cone-shaped rollers 54. Both delivery pumps A and B are thus placed in operation and the device is fluid locked, whereby driving and driven parts rotate as a unit. For manual operation of the transmission there is provided a foot pedal 64 to which the rod 61 is connected. When the foot pedal is depressed, as shown in Figure 2, delivery pumps A and B are rendered inoperative and the discharge port is open, the transmission of power being at zero. When the foot pedal is in raised position, as illustrated in Figure 8, the discharge port 51 is closed, the delivery pumps are placed in operation, and the mechanism constitutes a direct mechanical coupling.

According to the present disclosure the control rod 61 also is operable through the medium of a lever 65 to which it is fastened so as to oscillate therewith. One end of the lever 65 is pivoted upon a web 66, and the other end is pivotally connected to a piston rod 67 carrying a piston 68 which operates within a cylinder 69. A tube 70 connects the cylinder 69 with the intake manifold of the vehicle motor 1. The suction created by the engine thus acts through the tube 70 and the forward portion of the cylinder 69 to hold the piston 68 in its forward position, moving the rod 61 forwardly of the transmission assembly to close the discharge port 51 and cause the disc 55 to disengage the cone-shaped rollers 54. When the vacuum in the cylinder 69 is reduced, as may be caused by increased load on the vehicle engine, the piston is moved rearwardly by force of a spring 71 interposed between a collar 72 on the piston rod 67 and a supporting bracket 73 therefor. Thus the piston rod is retracted by the vacuum created by operation of the vehicle engine, and is extended when the force of the spring 71 overcomes the vacuum, and when moved into extended position operates to move the control rod 61 rearwardly of the transmission assembly to open the discharge port 51 and to cause the disc 55 to engage the cone-shaped rollers 54.

Operation

In the present embodiment the transmission assembly, comprising the front and rear rotors and associated parts and the cylindrical casing therefor, is enclosed in a housing 74 forming a fluid reservoir, the housing being formed with end bearings 75 and 76 in which the driving and driven shafts rotate. Fluid is introduced into the housing 74 in an amount sufficient to maintain its level above the lowermost rim of the splash guard 53, a sight glass 77 being provided that the fluid level may at all times be observed.

As before stated, Figure 2 of the drawings illustrates the relative positions of the control members when the transmission of power is at zero, as when the vehicle is stationary; while Figure 8 illustrates the relative positions of the control members when the transmission is in effect a direct drive. Between these two points the device is capable of affecting universal speed ratios between driving and driven parts, the manner of operation being as follows:

To place the transmission at zero, as when the vehicle is being stopped, the foot pedal 64 is manually depressed to move the control rod 61 rearwardly of the transmission assembly and cause the disc 55 to move into engagement with the cone-shaped rollers 54. The free ends of the arms 17 and 21 are thus moved outwardly from the shaft 3, thereby causing the rotor blades 16 and 19 to be retracted into the rotor chambers 8 and 9 to render the delivery pumps A and B inoperative. Movement of the control rod 61 also operates to open the discharge port 51 to relieve pressure on the blades 33 of the receiving pump or motor C. The foot pedal 64 may readily be locked in the position shown (see Figure 2) to prevent movement of the control members when the vehicle is stationary.

To place the vehicle in motion the foot pedal 64 is released (if locked) and allowed to gradually assume its normal or extended position. The manipulation of the foot pedal will be governed largely by the power developed by the engine, control over the foot pedal being exercised much in the same manner as is exercised over the clutch pedal in starting a vehicle having clutch control. As the foot pedal 64 assumes its normal position the control rod 61 is moved forwardly of the transmission assembly to move the disc 55 out of engagement with the cone-shaped rollers 54. Forward movement of the disc 55 permits the cone-shaped rollers 54 to move inwardly under impetus of the springs 22, thus actuating the control arms 21 to rotate the shafts 20 and cause the rotor blades 19 to engage the working surface of the pump chamber B. As the rotor blades approach the working surface of the pump chamber a pressure is created even before the rotor blades have fully engaged the working surface. The pressure increases as the rotor blades engage the working surface of the pump, the transmission ratio undergoing continuous change as the pump B is placed in operation and the discharge port 51 is partly closed by forward movement of the lever 62.

Further forward movement of the control rod 61, and consequent inward movement of the free ends of the control arms 21 and 17, serves to rotate the shafts 15 to cause the rotor blades 16 to approach the working surface of the pump chamber A. Both delivery pumps A and B are fully operating whenever both sets of rotor blades 19 and 16 have wholly engaged the working surfaces of the respective pump chambers. However, the transmission is not fluid locked, to affect a direct drive between driving and driven parts, until the discharge port 51 has been entirely closed. It will be noted that the levers 58 and 62 are so spaced on the rod 61 that the discharge port 51 is not closed until after both pumps A and B are in full operation; and that, conversely, the discharge port 51 is opened before either of the delivery pumps is rendered inoperative.

The speed ratio at which power is transmitted from driving to driven parts will depend primarily upon the volume and pressure of fluid pumped through the transmission assembly, and secondarily upon the torque created by operation of the pumps A and B which tends to rotate the cylindrical casing in a forward direction, which torque is transmitted directly to the driven shaft. While the discharge port 51 remains closed, the fluid is placed under pressure and held within the cylindrical casing, and driving and driven parts rotate at the same speed as though bolted together. When the load on the engine is increased to a point where the vacuum in the intake manifold and cylinder 69 is correspondingly lessened the spring 71 acts to move the piston rod 67 into extended position, which moves the control rod 61 rearwardly of the transmission assembly. Thereupon, either the speed of the engine must be accelerated or the vehicle speed will be reduced. As the vacuum gradually is reduced the discharge port 51 is opened, permitting fluid to be pumped through the cylindrical casing. In the device illustrated, the ratio between driving and driven parts, with the casing stationary and all pumps in operation and the discharge port 51 open, is 1.2 to 1. In the event the load on the engine is further increased and the vacuum further reduced, the control arms 17 move outwardly to gradually move the rotor blades 16 out of contact with the working surface of the pump chamber A, thereby gradually transferring the load to the pump B, to effect a driving ratio of 3 to 1.

Both pump chambers A and B are in communication with the suction or intake port 42 through ports 43—43 and intake passage 41; and both pumps discharge into the passage 44. A check valve 78 is disposed in the passage 44 intermediate the pumps A and B, the valve being held against its seat by pressure developed by the pump B to prevent fluid being forced back around through the pump chamber A and into the intake passage 41 at such times as the pressure developed by the pump A is less than that developed by the pump B, or when only the pump B is in operation. The valve 78 is unseated whenever the pressure developed by the pump A is sufficiently greater than the pressure developed by the pump B to lift the valve 78 from its seat.

As the rotor blades 16 and 19 approach the working surfaces of pump chambers A and B, these elements form an hydraulic abutment for rotating the casing against the resistance of the reaction torque created by the motor C. When in an intermediate position, the rotor blades 16 and 19 constitute a fluid impeller, and the passage 44, into which pumps A and B discharge, constitutes a turbine runner. Thus the rotor blades 16 and 19, and the passage 44 in the cylindrical casing, together form an hydraulic torque converter. This torque converter exists in the device up to the moment that the rotor blades 16 are brought into engagement with the working surface of the pump chamber A. Prior thereto, and after rotor blades 19 have engaged the working surfaces of the pump B, the rotor blades 16 continue to function as a positively driven impeller. The pressure created by operation of the rotor blades in intermediate position is exerted in the form of torque upon the cylindrical casing to rotate the casing in the direction of rotation of the drive shaft.

The passage 44, into which the pumps A and B discharge, terminates in a valved passage 48 communicating with the motor chamber C through either a forward intake port 79 or a reverse intake port 80, according to whether the vehicle is to be driven forwardly or rearwardly. Slidably mounted within the passage 48 is a tubular valve 81 which serves to open one of the intake ports (79 or 80) and close the other as the valve is operated.

When the vehicle is to be driven forwardly the valve 81 is moved to close the port 80 and to open the port 79, the flow of fluid being directed into the motor chamber C through the port 79 to drive the rotor 25 in the direction of rotation of the drive shaft, and being discharged from the motor chamber through the forward exhaust port 49. Reference is made to Figures 3 and 16 of the drawings in which arrows indicate the direction of flow. In its course through the motor chamber to drive the vehicle forwardly, the fluid passes over the port 50, which remains closed except at such times as the vehicle is driven rearwardly.

When the vehicle is to be driven rearwardly the valve 81 is moved to close the port 79 and to open the port 80 to direct the fluid into the motor chamber C through the port 80 to drive the rotor 25 in a direction opposed to the direction of rotation of the drive shaft, the fluid being discharged from the motor chamber through the reverse exhaust port 50. In its course through the chamber C to drive the vehicle rearwardly, the fluid passes over the port 49, which automatically is closed whenever the valve 81 is positioned to open the reverse intake port 80. Reference is made to Figures 3 and 17 of the drawings in which arrows indicate the direction of flow.

Slidably disposed in the forward exhaust port 49 and in the reverse exhaust port 50 are tubular valves 82 and 83, respectively. The valve 82, which serves to close and open the forward exhaust port 49, is operated by means of a lever 84 affixed to the inner end of a valve stem 85. The valves 81 and 83, the latter of which is disposed in the reverse exhaust port 50, are equipped with valve stems 86—86, and these, together with the valve stem 85, project through suitable bushings in the end face of the cylindrical casing 37.

When the venicle is to be driven forwardly, all of the valves 81, 82 and 83 are so positioned that the valve stems 85 and 86—86 project the maximum distance from the end face of the cylindrical casing. In this position the valve 81 closes the reverse intake port 80; the valve 83 closes the reverse exhaust port 50; and the valve 82 opens the forward exhaust port 49 to permit fluid to exhaust from the motor chamber therethrough. Since the normal movement of the vehicle is ahead, rather than in reverse, the valve stems which operate the respective valves are normally disposed in extended position relative to the cylindrical casing, into which position they are urged by helical springs 87—87.

Affixed to the outer end of each of the valve stems 85 and 86—86 is a roller 88 adapted to rollably engage an annular reversing disc 89. Normally the reversing disc 89 is maintained out of contact with the rollers 88 to avoid interference with the action of the springs 87 in holding the valve stems in extended position. When, however, the vehicle is to be driven rearwardly, the reversing disc 89 is moved into engagement with the rollers 88 so as to cause the valve stems to move the valves into reverse position. In this position the valve 81 closes the port 79; the valve 82 closes the forward exhaust port 49; and the valve 83 opens the reverse exhaust port 50 to permit fluid to exhaust from the motor chamber therethrough. Movement of the reversing disc 89 may be under control of a hand lever or other mechanism (not shown) as may be adapted to move the disc into and out of engagement with the rollers 88 on the valve stems.

As before explained, fluid which is exhausted from the motor chamber, either through the forward exhaust port 49 or the reverse exhaust port 50, enters the peripheral channel 31 in the bearing 30 from whence it is conducted through radial passages 52 to the discharge port 51.

It will be obvious that every revolution of the cylindrical casing at a slower speed than that at which the drive shaft is rotated serves to bring about one additional cycle of operation of the delivery pumps without increasing the speed of the engine. Particular advantages of this construction are flexibility of operation and the possibility of extremely low ratios of power transmission.

An added advantage of applicant's construction is the fact that there is no loss of power from friction within the cylindrical casing during forward operation of the vehicle. This is due to the fact that the cylindrical casing is driven entirely by torque, and that whatever friction is created therein tends toward driving the vehicle.

When the vehicle is to be driven in reverse, the fluid pressure transferred to the receiving pump or motor to impel the shaft 23 in a direction opposed to the direction of rotation of the drive shaft will cause the cylindrical casing to rotate forwardly in the direction of rotation of the drive shaft. It will be appreciated that as long as this condition prevails there would be no movement of the vehicle, due to the fact that with both delivery and receiving pumps tending to drive the casing forward, no pressure would be exerted against the rotor blades 33 to drive the vehicle in reverse. For this reason there is provided means to hold the cylindrical casing against rotative movement whenever the vehicle is to be driven in reverse, such means being herein disclosed as a brake band 90. The braking means is operable in the usual manner through the medium of a brake rod 91. The brake band 90 may also be operable by the foot pedal 64, whereby the brake is applied to stop rotation of the cylindrical casing whenever the food pedal is depressed.

It is not intended to limit the application of the present invention to a particular form of construction or arrangement of parts in an automotive vehicle. For example, the invention may be used, either in its entirety or in part, and either with or without modification, for industrial and marine purposes as well, without departing from the spirit of the invention, and I deem myself entitled to all such uses, modifications and/or variations as fall within the spirit and scope of the appended claims.

Having now described my invention and in what manner the same may be used, what I claim as new and desire to protect by Letters Patent is:

1. In a transmission mechanism: a drive shaft and a driven shaft; a delivery pump comprising a rotor directly connected to the drive shaft, a casing therefor, and rotor blades mounted in said rotor for operatively engaging said casing; a receiving pump having greater displacement than said delivery pump, said receiving pump comprising a rotor directly connected to the driven shaft, a casing therefor, and rotor blades mounted in said rotor for operatively engaging said casing; the rotor blades in one of said pumps being adapted to be maintained in retracted position relative to the rotor to render said pump inoperative.

2. A transmission mechanism comprising a drive shaft and a driven shaft, a pump rotor secured to said drive shaft, a motor rotor secured to said driven shaft, a cylindrical casing enclosing both said rotors, said pump rotor and said casing together forming a delivery pump, said motor rotor and said casing together forming a receiving pump or motor having greater capacity than said delivery pump, the intake for the motor chamber being positioned hydraulically ahead of the discharge from the pump chamber, like points in the receiving pump or motor chamber being displaced from those in the delivery pump chamber by an arc of approximately 150°, and fluid passages in said casing interconnecting said chambers.

3. A transmission mechanism comprising: a drive shaft and a driven shaft; a delivery pump having a rotor directly connected to the drive shaft, a casing for said pump, and rotor blades mounted in said rotor for operatively engaging said casing; a receiving pump of greater capacity than said delivery pump and having a rotor directly connected to the driven shaft, a casing for said pump, and rotor blades mounted in said rotor for operatively engaging said casing; means to selectively direct the flow of fluid from said delivery pump to opposite sides of the rotor blades in said receiving pump to determine the direction of rotation of said receiving pump, and means to control the discharge of fluid from the motor chamber to govern the ratio of speed between the drive shaft and the driven shaft.

4. A transmission mechanism comprising a drive shaft and a driven shaft, a pump rotor secured to said drive shaft, a motor rotor secured to said driven shaft, a cylindrical casing enclosing both said rotors, said pump rotor and said casing together forming a delivery pump, said motor rotor and said casing together forming a receiving pump or motor of greater capacity than said delivery pump, a fluid passage in said casing connecting the two pumps, means for controlling the effective displacement of the delivery pump independently of the operation of the drive shaft, and a control valve to regulate the flow of liquid leaving said receiving pump, the cylindrical casing rotatably engaging said rotors, the rotation of said cylindrical casing being controlled by the torque created by said pumps.

5. In a fluid transmission mechanism: a drive shaft and a driven shaft, a delivery pump operated by rotation of the drive shaft, a receiving pump or motor of greater displacement volume than said delivery pump for operating the driven shaft, a fluid passage for the delivery of fluid from the delivery pump to the receiving pump, and means for controlling operation of the pumping elements of the delivery pump independently of the operation of the drive shaft to cause said pump to produce a predetermined pressure upon the motor element to operate the driven shaft.

6. In a fluid transmission mechanism: a drive shaft and a driven shaft, a delivery pump operated by rotation of the drive shaft, a receiving pump or motor of greater capacity than said delivery pump for operating the driven shaft, a fluid passage for the delivery of fluid from the delivery pump to the receiving pump, and means for controlling operation of either of said pumps independently of the operation of said shafts to determine the pressure delivered to the motor to operate the driven shaft.

7. In a fluid transmission mechanism: a drive shaft and a driven shaft, a delivery pump operated by rotation of the drive shaft, a receiving pump or motor for operating the driven shaft, a fluid passage for the delivery of fluid from the delivery pump to the receiving pump to produce rotation of said driven shaft in the same direction as said drive shaft, and a valve for regulating the flow of fluid from the motor chamber, said valve being operable to fluid lock said transmission to effect a direct drive.

8. In a fluid transmission mechanism: a drive shaft and a driven shaft, a delivery pump operated by rotation of the drive shaft, a receiving pump or motor of greater capacity than said delivery pump for operating the driven shaft, a fluid passage for the delivery of fluid from the delivery pump to the receiving pump, and means to control the ratio between the drive and driven shafts, said means being operable to fluid lock said transmission to effect a direct drive, said means requiring for fluid locking operation only a quantity of oil sufficient to fill said two pumps.

9. A fluid transmission mechanism comprising, a drive shaft and a driven shaft, a pump rotor secured to the drive shaft, a motor rotor secured to the driven shaft, rotor blades mounted in said pump rotor, rotor blades mounted in said motor rotor, a cylindrical casing enclosing both said rotors and rotatably engaging said pump and motor elements for rotation relative thereto, the pump rotor and rotor blades and casing together forming a multiple number of delivery pumps, the motor rotor and rotor blades and casing together forming a receiving pump or motor; means to move said rotor blades into and out of engagement with said casing to control the operation of said delivery pumps independently of the operation of the drive shaft; a fluid passage for delivery of fluid from the delivery pumps to the motor; the fluid pumped by said delivery pumps being delivered to the motor to drive the driven shaft in the same direction as said drive shaft, the pressure created by operation of both delivery pumps being exerted in the form of torque upon the cylindrical casing to rotate the casing in the direction of rotation of the drive shaft; the mechanism being so constructed and arranged that rotation of the cylindrical casing serves to apply additional driving force to drive the driven shaft, and a valve for regulating the flow of liquid from the motor chamber, said valve being operable to fluid lock said transmission to effect a direct drive.

10. A fluid transmission mechanism comprising, a drive shaft and a driven shaft, a pump rotor secured to the drive shaft, a motor rotor secured to the driven shaft, rotor blades mounted in said pump rotor, rotor blades mounted in said motor rotor, a cylindrical casing enclosing both said rotors and rotatably engaging the pump and motor elements for rotation relative thereto, the pump rotor and rotor blades and casing together forming a delivery pump, the motor rotor and rotor blades and casing together forming a receiving pump or motor, means to control the operation of said delivery pump independently of the operation of the drive shaft; a fluid passage for the delivery of fluid from the delivery pump to the motor, the fluid pumped by said delivery pump being delivered to the motor through said passage to drive the driven shaft in the same direction as said drive shaft, the pressure created by operation of the delivery pump being exerted in the form of torque upon the cylindrical casing to rotate the casing in the direction of rotation of the drive shaft, the mechanism being so constructed and arranged that rotation of the cylindrical casing serves to apply additional driving force to drive the driven shaft, and a valve for regulating the flow of liquid from the motor chamber, said valve being operable to fluid lock said transmission to effect a direct drive.

11. A fluid transmission mechanism comprising, a drive shaft and a driven shaft, a delivery pump operatively connected to the drive shaft, a receiving pump or motor operatively connected to the driven shaft, a cylindrical casing enclosing both said pumps and rotatably engaging said pump elements for rotation relative thereto, means for controlling the operation of said delivery pump independently of the operation of the drive shaft, a fluid passage for the delivery of fluid from the delivery pump to the motor, the fluid pumped by said delivery pump being delivered to the motor through said passage to drive the driven shaft in the same direction as said drive shaft, the pressure created by operation of the delivery pump being exerted in the form of torque upon the cylindrical casing to rotate the casing in the direction of rotation of the drive shaft, the mechanism being so constructed and arranged that rotation of the cylindrical casing serves to apply additional driving force to drive the driven shaft.

12. A fluid transmission mechanism comprising a drive shaft and a driven shaft, a delivery pump operatively connected to the drive shaft, a receiving pump or motor of greater capacity than said delivery pump and operatively connected to the driven shaft, a cylindrical casing enclosing both said pumps and cooperating with said pump elements, a fluid passage for the delivery of fluid from the delivery pump to the motor, the fluid pumped by said delivery pump being delivered to the motor through said passage to drive the driven shaft, and means for controlling operation of the delivery pump independently of the operation of the drive shaft to cause said pump to produce a predetermined pressure upon the motor element to operate the driven shaft.

13. A fluid transmission mechanism, comprising a drive shaft and a driven shaft, elements of a delivery pump mounted on said drive shaft, elements of a receiving pump mounted on said driven shaft, and a rotatable casing enclosing both sets of pump elements, one end of said casing forming with said first-named pump elements a delivery pump and the other end of said casing forming with said second-named pump elements a receiving pump, a fluid passage in said casing connecting the two pumps, and an adjustable exhaust valve for the receiving pump, the displacement of the delivery pump being less than the displacement of the receiving pump whereby the fluid flow exerts a torque on the casing in opposition to the reaction from the receiving pump elements to effect an automatic, variable ratio drive when said exhaust port is open, and whereby a fluid lock condition for direct drive is effected when said exhaust port is closed.

14. A fluid transmission mechanism, comprising a drive shaft and a driven shaft, elements of a delivery pump mounted on said drive shaft, elements of a receiving pump mounted on said driven shaft, and a rotatable casing enclosing both sets of pump elements, one end of said casing forming with said first-named pump elements a delivery pump and the other end of said casing forming with said second-named pump elements a receiving pump, a fluid passage in said casing connecting the two pumps, and an adjustable exhaust valve for the receiving pump, means to vary the effective displacement of the delivery pump whereby the fluid flow exerts a torque on the casing in opposition to the reaction from the receiving pump elements to effect an automatic, variable ratio drive when said exhaust port is open, and whereby a fluid lock condition for direct drive is effected when said exhaust port is closed, the displacement of the delivery pump at all times being less than the displacement of the receiving pump.

15. A fluid transmission mechanism, comprising a drive shaft and a driven shaft, elements of a delivery pump mounted on said drive shaft, elements of a receiving pump mounted on said driven shaft, and a rotatable casing enclosing both sets of pump elements, one end of said casing forming with said first-named pump elements a delivery pump and the other end of said casing forming with said second-named pump elements a receiving pump, means to vary the effective displacement of the delivery pump, a fluid passage in said casing connecting the two pumps, and an adjustable exhaust valve for the receiving pump, and means interconnecting said first named means and said exhaust valve to provide for coincidental operation of said elements.

16. In a fluid transmission mechanism: a drive shaft and a driven shaft, delivery pumps operated by rotation of the drive shaft, receiving pumps or motors for operating the driven shaft, the total capacity of the receiving pumps or motors being greater than the total capacity of the delivery pumps, a fluid passage for the delivery of fluid from the delivery pumps to the receiving pumps, and means for controlling operation of any one of said pumps independently of the operation of said shafts to determine the pressure delivered to the receiving pumps or motors to operate the driven shaft.

DANIEL F. McGILL.